(12) United States Patent
Baek et al.

(10) Patent No.: US 7,970,405 B2
(45) Date of Patent: Jun. 28, 2011

(54) METHOD OF TRANSMITTING DATA IN HANDOVER BETWEEN BASE STATIONS IN WIRELESS COMMUNICATION SYSTEM

(75) Inventors: Seung-Kwon Baek, Daejeon (KR);
Jae-Su Song, Daejeon (KR);
Yeon-Seung Shin, Daejeon (KR);
Yeong-Jin Kim, Daejeon (KR)

(73) Assignees: Electronics and Telecommunications Research Institute, Daejeon (KR);
Samsung Electronics Co., Ltd., Gyeonggi-do (KR)

( * ) Notice: Subject to any disclaimer, the term of this patent is extended or adjusted under 35 U.S.C. 154(b) by 935 days.

(21) Appl. No.: 11/842,434

(22) Filed: Aug. 21, 2007

(65) Prior Publication Data

US 2008/0132240 A1 Jun. 5, 2008

(30) Foreign Application Priority Data

Dec. 1, 2006 (KR) .................. 10-2006-0120761
Feb. 23, 2007 (KR) .................. 10-2007-0018505

(51) Int. Cl.
*H04W 36/00* (2009.01)
(52) U.S. Cl. ........ 455/442; 455/436; 455/437; 455/438; 455/439; 370/331; 370/332; 370/333; 370/334
(58) Field of Classification Search .......... 455/436–444; 370/331–334
See application file for complete search history.

(56) References Cited

U.S. PATENT DOCUMENTS 5,345,467 A * 9/1994 Lomp et al. .................. 370/331
6,477,157 B1 * 11/2002 Kim et al. .................... 370/331
2002/0045450 A1 4/2002 Shimizu et al.
2003/0083087 A1 * 5/2003 Ekl et al. ...................... 455/518
2003/0224786 A1 * 12/2003 Lee et al. ................... 455/432.1

(Continued)

FOREIGN PATENT DOCUMENTS

EP 1 128 704 A1 8/2001

(Continued)

OTHER PUBLICATIONS

Rohit Ghai et al; "An Architecture and Communication Protocol for Picocellular Networks Maintaining Seamless Communication Between Mobile Users" IEEE Personal Communications, IEEE Communications Society, US, vol. 1, No. 3, Jul. 1, 1994, pp. 36-46, XP000461833.

(Continued)

*Primary Examiner* — Jinsong Hu
*Assistant Examiner* — Dung Hong
(74) *Attorney, Agent, or Firm* — Ladas & Parry LLP

(57) ABSTRACT

The present invention relates to a method of transmitting data in a handover between base stations. When a mobile terminal performs a handover between base stations in a wireless communication system, a gateway transmits data traffic to be transmitted to a mobile terminal by using an IGMP (Internet Group Management Protocol) to a serving base station being serviced to the mobile terminal and a target base station to which a handover of the mobile terminal is made in a bi-casting method. Accordingly, when the mobile terminal performs the handover between the base stations, the gateway transmits the data traffic in the bi-casting method. As a result, it is possible to efficiently use a resource of a user plane connection interval between the gateway and the base station, thereby minimizing the loss of data traffic transmitted in a downlink, that is, data.

16 Claims, 13 Drawing Sheets

U.S. PATENT DOCUMENTS

| | | | |
|---|---|---|---|
| 2005/0286470 A1* | 12/2005 | Asthana et al. | 370/331 |
| 2006/0025151 A1 | 2/2006 | Karaoguz et al. | |
| 2006/0104274 A1 | 5/2006 | Caviglia et al. | |
| 2006/0159050 A1 | 7/2006 | Kim et al. | |
| 2006/0215607 A1* | 9/2006 | Mitchel et al. | 370/331 |
| 2007/0213060 A1* | 9/2007 | Shaheen | 455/436 |

FOREIGN PATENT DOCUMENTS

| | | |
|---|---|---|
| JP | 2005-311580 | 11/2005 |
| KR | 1020010083222 A | 8/2001 |
| KR | 1020060026311 A | 3/2006 |
| KR | 1020060040183 | 5/2006 |
| KR | 1020060084749 A | 7/2006 |
| KR | 1020060107216 | 10/2006 |
| KR | 1020060118279 A | 11/2006 |
| WO | 02/33999 A1 | 4/2002 |
| WO | 03/039029 A1 | 5/2003 |
| WO | 2005/119965 A1 | 12/2005 |

OTHER PUBLICATIONS

Karim El Malki, et al: "Simultaneous Bindings for Mobile IPv6 Fast Handoffs" Internet Citation (Online) Jun. 2002, XP002325023 Retrieved from the Internet: URL:http://www.join.uni-muenster.de/Dokumente/drafts/daft-elmalki-mobileip-bicasting-v6-02.txt> (retrieved on Apr. 18, 2005).

European Search Report dated May 8, 2008; Application No./Patent No. 07114624.5-2412.

European Office Communication; Application No. 07 114 624.5-2412; dated Mar. 22, 2010.

* cited by examiner

< Control Plane >

< User Plane >

FIG.5

| Type | Max. Resp.Time | Checksum |
|---|---|---|
| Group Address | | |

| Message Name | | Description |
|---|---|---|
| IGMP Query(IPv4) | IGMP Query(IPv6) | aGW transmits information of multicast group to host |
| IGMP Membership Report(IPv4) | IGMP Report(IPv6) | Host transmits information of multicast group to aGW in order to join multicast group |
| IGMP Leave Group(IPv4) | IGMP Done(IPv6) | Host transmits information of multicast group to leave multicast group |

METHOD OF TRANSMITTING DATA IN HANDOVER BETWEEN BASE STATIONS IN WIRELESS COMMUNICATION SYSTEM

CROSS-REFERENCE TO RELATED APPLICATION

This application claims priority to and the benefit of Korean Patent Application No. 10-2006-0120761 filed in the Korean Intellectual Property Office on Dec. 1, 2006, and No. 10-2007-0018505 filed in the Korean Intellectual Property Office on Feb. 23, 2007, the entire contents of which are incorporated herein by reference.

BACKGROUND OF THE INVENTION (a) Field of the Invention

The present invention relates to a handover, and more particularly to a method of transmitting data in a handover between base stations.

This work was supported by the IT R&D program of MIC/IITA [2005-S-404-22, Research and development on 3G long-term evolution access system].

(b) Description of the Related Art

In general, in a next generation wireless communication system (3GPP), when a mobile terminal performs a handover between base stations, a gateway transmits data traffic by using a user plane connection interval (hereinafter referred to as "S1 interface") between the gateway and the base station that is used in order to provide a flexible service to the base station. However, when the data traffic is transmitted from the gateway to the base station by using the S1 interface, a bi-casting transmission method is used in which the data traffic is transmitted to a serving base station providing a service to the mobile terminal and a target base station to which a handover of the mobile terminal is made. At this time, an overhead is generated due to bi-casting.

Further, when the handover of the mobile terminal is generated between a plurality of base stations, a forwarding path is lengthened. As a result, a packet transmission delay occurs until packets are reordered in a target base station to which a handover is made. In order to prevent the packet transmission delay, a method has been suggested in which switching is made in the gateway. However, according to this method, there is a problem in that another method needs to be additionally considered so as to reduce a packet loss, such as buffering of the gateway.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of transmitting data, having advantages of minimizing the loss of data that is to be transmitted to a mobile terminal, when the mobile terminal performs a handover between base stations in a wireless communication system.

According to one exemplary embodiment of the present invention provides, a method of transmitting data in a handover between a serving base station and a target base station in a wireless communication system is provided. The method includes: receiving a first handover request message including information on a target base station from a serving base station; transmitting a second handover request message including multicast group information to the target base station based on the first handover request message; receiving a message informing that the target base station joins the multicast group from the target base station, the message including the multicast group information that is updated by including the information on the target base station; transmitting data traffic to the serving base station and the target base station; and receiving a handover completion message from the target base station, the handover completion message informing that a handover of a mobile terminal is completed from the serving base station to the target base station included in the updated multicast group information; and transmitting the data traffic to the mobile terminal through the target base station.

According to another exemplary embodiment of the present invention, a method of performing a handover in a target base station of a wireless communication system is provided. The method includes: receiving a handover request message including multicast group information from a gateway; transmitting a message informing that the target base station joins a multicast group including a mobile terminal and a serving base station to the gateway on based on the handover request message, the message including the multicast group information that is updated by including information on the target base station; receiving data traffic from the gateway; buffering the received data traffic until a handover of the mobile terminal is completed; receiving a base station context data message from the serving base station; performing a synchronization with the mobile terminal and setting a wireless interval; and transmitting the buffered data traffic to the mobile terminal based on the base station context data message when receiving a handover completion message from the mobile terminal.

BRIEF DESCRIPTION OF THE DRAWINGS

FIGS. 5 and 6 are views illustrating a packet structure for an IGMP according to an exemplary embodiment of the present invention.

FIG. 7 is an exemplary view defining an IGMP message according to an exemplary embodiment of the present invention.

DETAILED DESCRIPTION OF THE EMBODIMENTS

Figure 1:
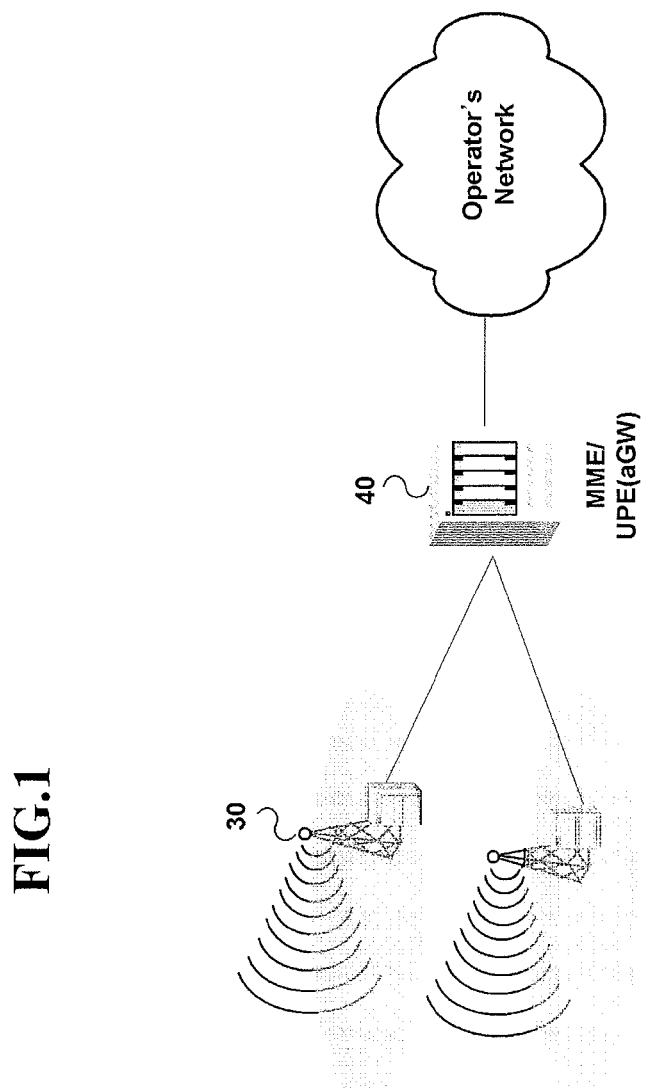
FIG. 1 is a view illustrating a structure of a general wireless communication system.
Figure 1:
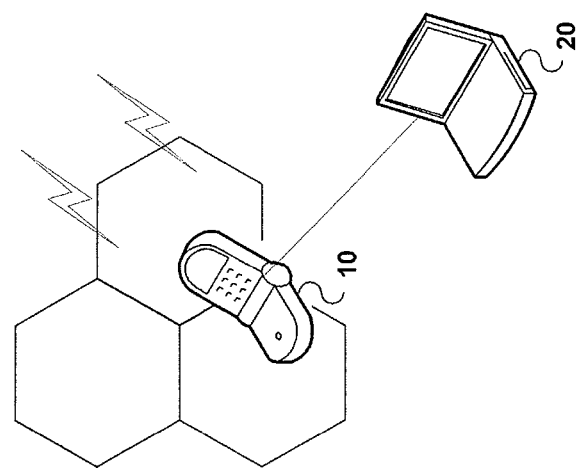

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

FIG. 1 is a view illustrating a structure of a general wireless communication system.

In FIG. 1, a structure of an IP-based next generation wireless communication system of a third generation (3GE) system, which is a field of a wireless communication system, is exemplified. In this case, the IP-based next generation wireless communication system means a system that uses a wireless access method, such as Orthogonal Frequency Division Multiplexing (OFDM). In the third generation system, schematically, a mobile terminal (User Equipment, UE) 10, a evolved Node B (eNB, hereinafter referred to as "base station") 30, and a Access Gateway (aGW, hereinafter referred to as "gateway") 40 are connected to one another.

Specifically, the mobile terminal 10 may be classified into an Mobile Terminal (MT) that performs a wireless access function and a protocol function and Terminal Equipment (TE) 20 that performs a service function. The base station performs a wireless access function and a protocol function in a state where it is interconnected with the mobile terminal 10. The gateway may be divided into an Mobility Management Entity (MME) that performs a protocol function and a control function in a state where it is interconnected with the mobile terminal 10, and a User Plane Entity (UPE) that performs a data traffic processing function.

Next, referring to FIGS. 2A and 2B, a description is given to a structure of a protocol that operates at each node of the wireless communication system having been described with reference to FIG. 1. In this case, the protocol structure will be described in a state where the protocol structure is divided into a protocol stack of a control plane shown in FIG. 2A and a protocol stack of a user plane shown in FIG. 2B.

Figure 2A:
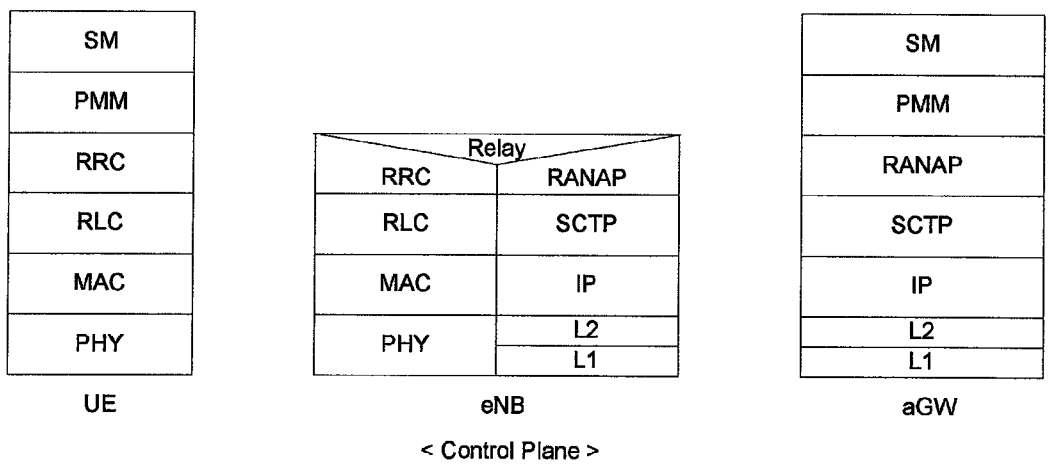
FIGS. 2A and 2B are views illustrating a protocol structure of a general wireless communication system.
Figure 2B:
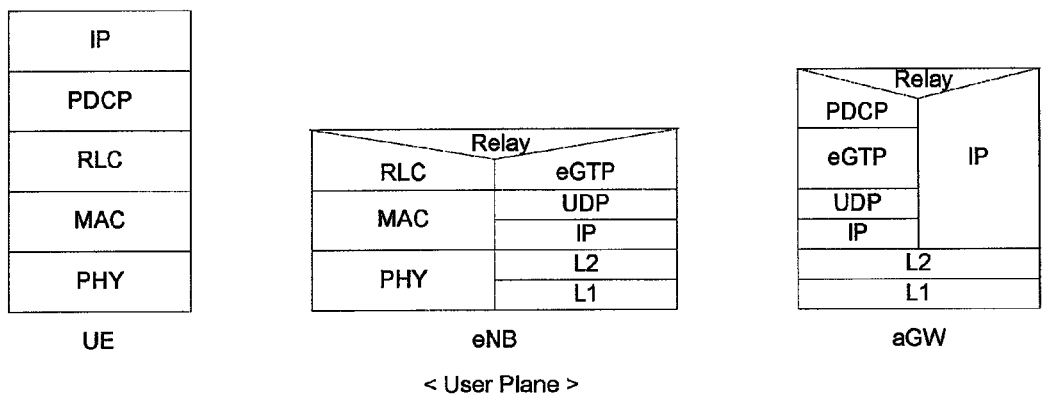

FIGS. 2A and 2B are views illustrating a protocol structure of a general wireless communication system.

In particular, FIG. 2A is a view illustrating a protocol stack of a control plane in a protocol structure of a general wireless communication system, and FIG. 2B is a view illustrating a protocol stack of a user plane in the protocol structure of the general wireless communication system.

As shown in FIG. 2A, a structure of the protocol stack of the control plane may be divided into a structure of a protocol stack of the mobile terminal 10, a structure of a protocol stack of the base station 30, and a structure of a protocol stack of the gateway 40. First, the protocol stack of the mobile terminal 10 includes Physical (PHY), Media Access Control (MAC), Radio Link Control (RLC), Radio Resource Control (RRC), Packet Mobility Management (PMM), and Session Management (SM).

Further, the protocol stack of the base station 30 includes PHY, Layer 1 (L1), Layer 2 (L2), MAC, IP, RLC, Stream Control Transmission Protocol (SCTP), RRC, Radio Access Network Application Part (RANAP), and Relay, and the protocol stack of the gateway 40 includes L1, L2, IP, SCTP, RANAP, PMM, and SM. The above-described control plane is a generally standardized UMTS protocol stack, which can be understood by those who skilled in the art. Therefore, in the exemplary embodiment of the present invention, a specific description thereof will be omitted.

Next, as shown in FIG. 2B, a structure of the protocol stack of the user plane may be divided into a structure of a protocol stack of the mobile terminal 10, a structure of a protocol stack of the base station, and a structure of a protocol stack of the gateway, similar to the control plane. In this case, since the user plane protocol is already well-known, a detailed description thereof will be omitted in the exemplary embodiment of the present invention.

A method of transmitting data traffic in a handover between base stations according to the exemplary embodiment of the present invention is implemented by transmission of data traffic through the evolved GPRS (General Packet Radio Service) Tunneling Protocol (eGTP) that is the user plane protocol between the gateway and the base station in the protocol structure of the wireless communication system shown in FIGS. 2A and 2B. Before describing the transmission of data traffic through the eGTP according to the exemplary embodiment of the present invention, first, a data connection structure between a general gateway 40 and a general base station 30 will be described with reference to FIG. 3.

Figure 3:
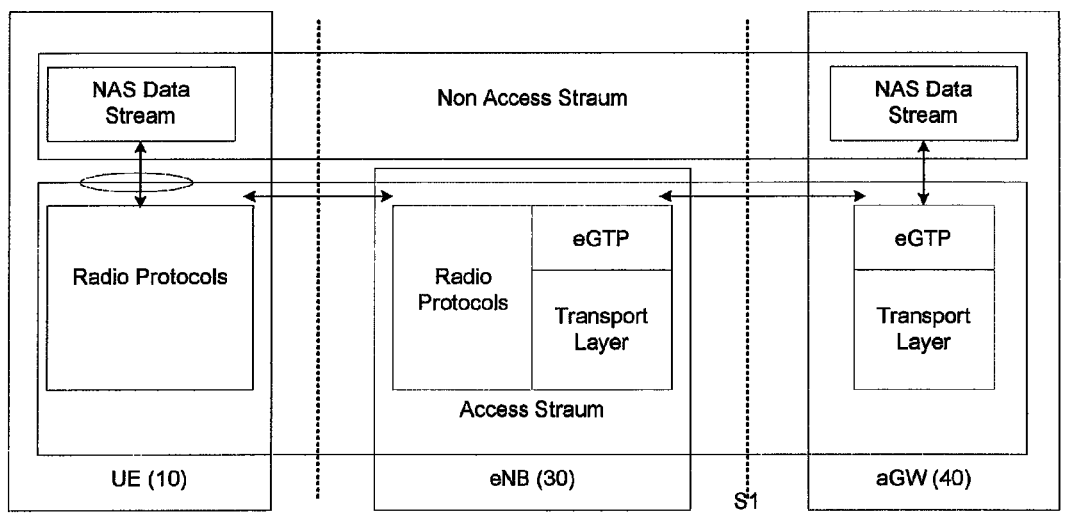
FIG. 3 is an exemplary view illustrating a data connection structure between a general gateway and a general base station.

FIG. 3 is an exemplary view illustrating a data connection structure between a general gateway and a general base station.

A user plane connection point between the gateway and the base station is generally defined by S1, and through the S1, the gateway, which receives an IP-based packet from an upper layer, transmits upper/lower data traffic to the serving base station which provides service to the mobile terminal. FIG. 3 shows the S1, which illustrates a structure of an S1 interface.

The data traffic that has been received from the base station 30 through the S1 interface is transmitted to a mobile terminal by using a predetermined radio bearer (RB), and for this purpose, the gateway needs to manage an SAE bearer context.

Next, among handovers of the wireless communication system, a handover between base stations will be described with reference to FIG. 4. In this case, as an example of the wireless communication system, a third generation system is exemplified, but the example of the wireless communication system is not limited to the third generation system.

Figure 4:
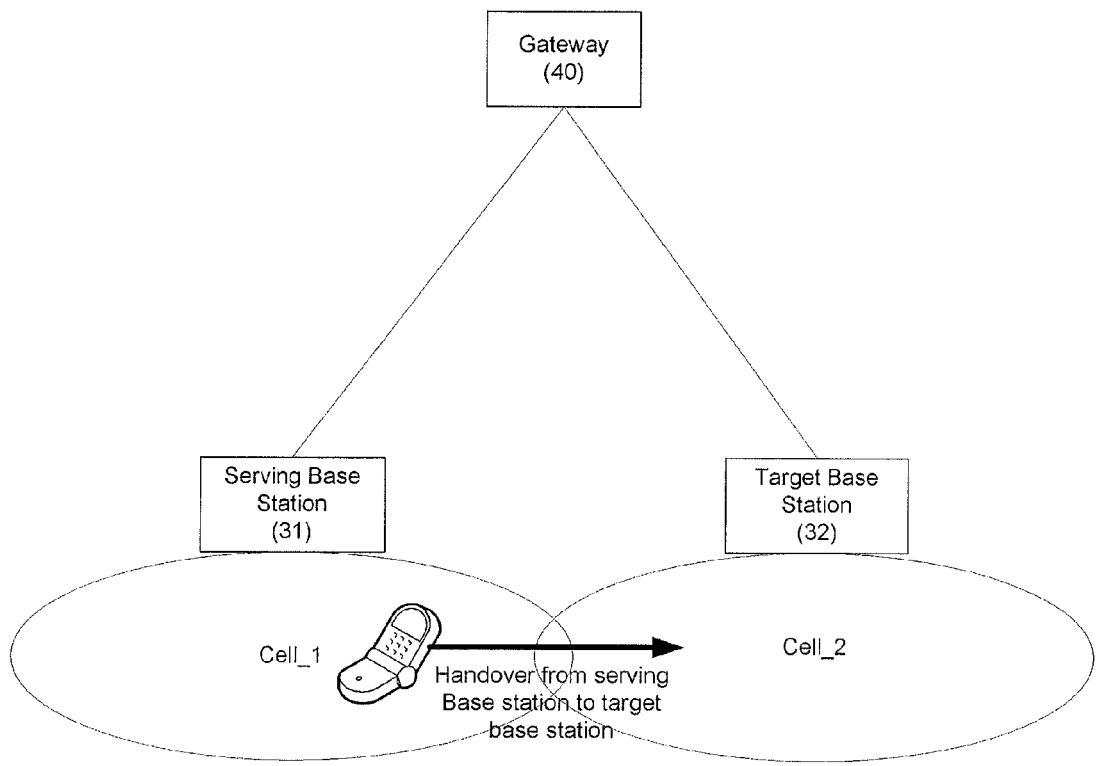
FIG. 4 is an exemplary view illustrating a handover between general base stations.

FIG. 4 is an exemplary view illustrating a handover between base stations in a general wireless communication system.

As shown in FIG. 4, generally, the handover of the wireless communication system means a process of enabling the mobile terminal 10 to move while the mobile terminal 10 maintains a smooth communication between base stations 31 and 32. That is, the handover situation between the base stations 31 and 32 means that the handover is generated when the mobile terminal 10 moves from the serving base station 31 interconnected with the gateway 40 to the target base station 32.

When the handover is generated, the corresponding handover is determined as follows. The serving base station 31 receives a periodic measurement report of the mobile terminal 10, and the target base station 32 and the handover are determined on the basis of the received information. According to the current 3GPP standardization, in order to minimize the loss of data traffic being serviced in a handover between wireless communication systems and give flexible service, a method of transmitting data traffic using the SI interface has been suggested as follows.

1) Bi-Casting in Gateway

According to bi-casting in the gateway, when the mobile terminal performs a handover between the base stations, the S1 interfaces are connected from the gateway to the serving base station and the target base station so as to bi-cast the data traffic. If this method is used, data traffic forwarding does not exist between the serving base station and the target base station, which reduces a load due to the forwarding. However, the resource consumption is large between the S1 interfaces, and an overhead is generated when simultaneously transmitting data traffic from the gateway to the serving base station and the target base station.

2) Forwarding of Data Traffic from Serving Base Station to Target Base Station

The forwarding of the data traffic from the serving base station to the target base station is a method of setting a tunnel between the serving base station and the target base station and forwarding the data traffic through the tunnel. According to this method, the amount of resources that are consumed at the time of connecting the S1 interfaces is small compared with the case of bi-casting. However, high costs are required to reorder packets received from the target base station, and a forwarding path is lengthened when a handover is generated between a plurality of base stations. Further, a packet transmission delay occurs due to the reordering of the packets that are received from the target base station.

3) Switching in Gateway

The switching in the gateway is a method of switching an S1 path in the gateway when a handover is generated. In this method, forwarding of the packets does not occur. However, a method of reducing a packet loss such as buffering of the gateway needs to be additionally considered. Further, a packet transmission delay occurs due to the corresponding buffering.

The exemplary embodiment of the present invention suggests a method that is capable of minimizing data traffic loss when performing a handover between base stations and reducing complexity in an operation of the base stations. For this purpose, as described with reference to FIG. 4, when the mobile terminal performs a handover between the base stations, data traffic is transmitted between the gateway and the base station by using the bi-casting method.

That is, in a general method, after the handover is determined, the gateway sets a unicast tunnel for each of the serving base station and the target base station. However, in the exemplary embodiment of the present invention, the gateway sets a multicast group for the serving base station and the target base station, and transmits data traffic to the serving base station and the target base station included in the corresponding multicast group by using a bi-casting method.

Further, data connection between the gateway and the base station is performed through the S1 interface by using the eGTP protocol that is shown in the user plane of FIG. 2B. At this time, since the eGTP protocol is a form of UDP/IP, an IP-level multicast does not affect the eGTP protocol. However, transport is only transmitted in multicast, thereby allowing the S1 resource to be efficiently used.

Further, in the IP-based wireless communication system that is currently at the standardization work, it is required for the transport to apply IPv4 and IPv6. For this purpose, it is possible to use an Internet Group Management Protocol (IGMP) that is suggested by IETF, which is the standard Internet substitute. Under this definition, referring to FIGS. 5 and 6, a description is given to a packet structure for IGMP according to the exemplary embodiment of the present invention.

FIG. 5 is a view illustrating a packet structure for IGMP according to an exemplary embodiment of the present invention. Specifically, FIG. 5 shows an example of a packet structure that is based on IPv4.

As shown in FIG. 5, an IGMP message has a packet structure that includes a type field, a maximum response time (max resp. time) field, a checksum field, and a group address field.

In this case, the type field is used to discriminate between an inquiry, which a multicast router transmits to a host, and a response, which the host sends. That is, the type field defines the types of messages, and an inquiry message can be represented by 1 and a report message can be represented by 2. The maximum response time field is only used at the time of the inquiry, and designates a maximum allowed time when sending a response in a $\frac{1}{10}$ unit.

The checksum field, which indicates a simple mathematical calculation value that is used to confirm an error of header information, displays a checksum on an ICMP message. The group address field means an IP address of a class D (i.e., a group for applying a communication of a multicast type to be a point-to-multipoint communication). Generally, in an inquiry process, a group ID is set to 0, and a group address in a report process indicates a reported group address. In the above-described IPv4, the IGMP message structure is a packet structure that is suggested in RFC2236, and a detailed description thereof will be omitted.

Figure 6:
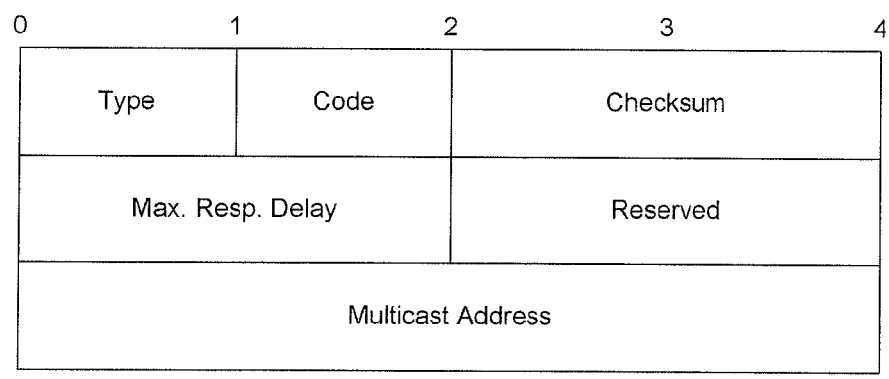

Similar to IPv4, even in IPv6, the same IGMP message structure is used. Different from the IPv4, the IPv6 further includes a code field and a multicast address field. This is shown in FIG. 6 in which IPv6 is exemplified in a packet structure for an IGMP according to the exemplary embodiment of the present invention.

That is, a discriminator for allowing a function of packets to be determined is written in the code field, and it is possible to know whether a message is broadcast or not on the basis of the code field. The multicast address field stores an address of a multicast group that includes a mobile terminal and a serving base station that transmit and receive data traffic.

The process of the IGMP protocol, which uses the packet structure for the IGMP, may be divided into a process of transmitting information of the multicast group, a process of joining a specific multicast group, and a process of leaving the specific multicast group. The definition of messages for these processes is shown in FIG. 7.

FIG. 7 is an exemplary view defining an IGMP message according to an exemplary embodiment of the present invention.

As shown in FIG. 7, the IGMP message includes IGMP membership report information for joining the target base station with a specific multicast group, IGMP leaving group information for leaving the specific multicast group, and query information for transmitting multicast group information.

Next, referring to FIG. 8, a detailed description is given to a process of transferring data traffic in bi-casting in a handover between base stations by using an IGMP message that has been described with reference to FIG. 7.

Figure 8:
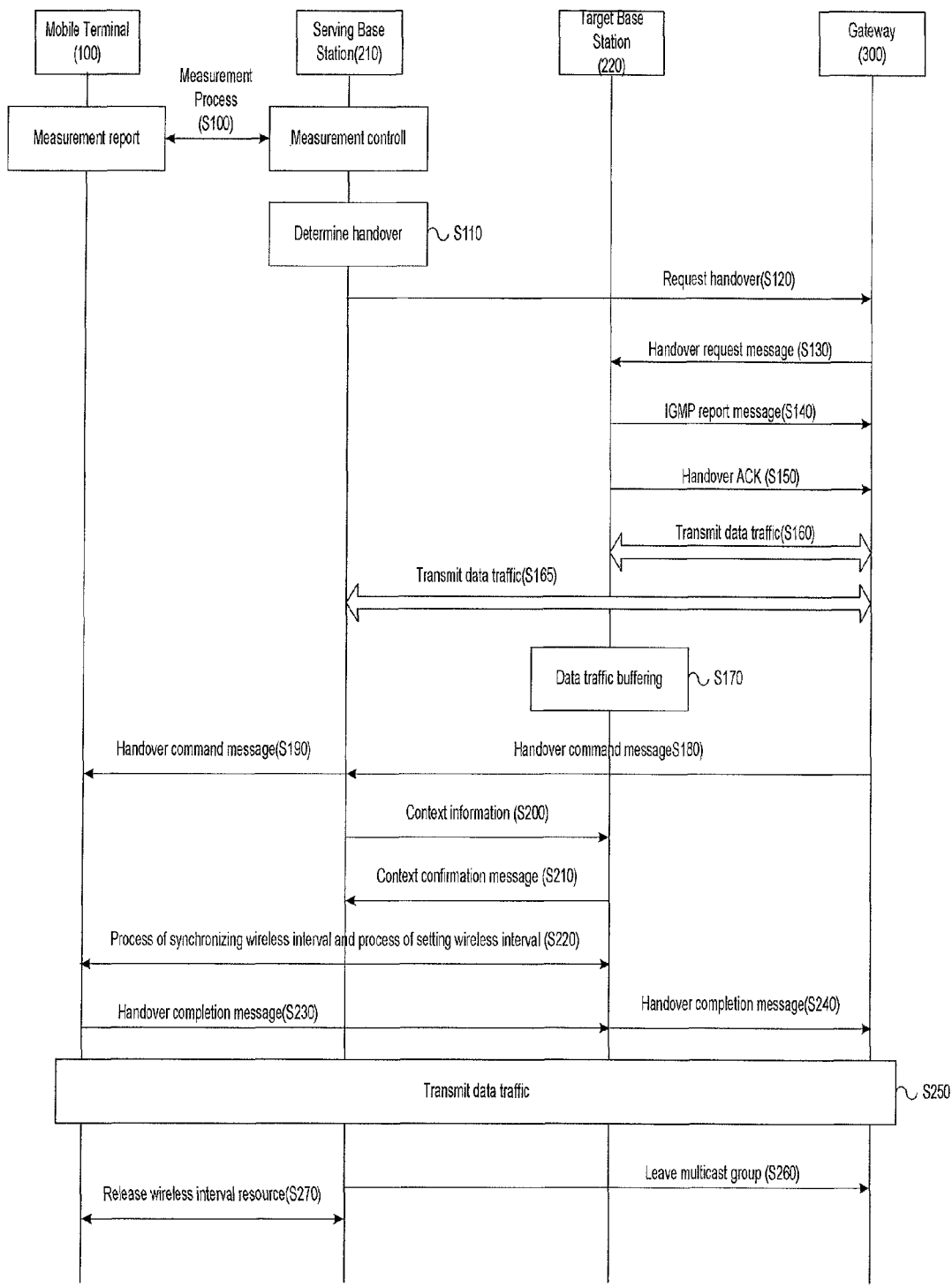
FIG. 8 is a flowchart illustrating a process of transmitting data in a handover between base stations according to an exemplary embodiment of the present invention.

FIG. 8 is a flowchart illustrating a process of transferring data traffic in a handover between base stations according to an exemplary embodiment of the present invention.

As shown in FIG. 8, the mobile terminal 100 is periodically interconnected with the serving base station and performs a measurement process (Step S100). Through the measurement process, the mobile terminal 100 can estimate the signal intensity of a pilot channel of the serving base station 210, and the serving base station 210 can determine whether the handover is needed or not according to the estimated result that is reported from the mobile terminal 100. That is, if the mobile terminal 100 has a signal intensity that is stronger than the signal intensity of the estimated pilot channel, the serving base station 210 determines that the handover is needed in the corresponding mobile terminal 100.

When the handover is needed in the mobile terminal 100 on the basis of the measurement information collected in Step S100, the serving base station 210 determines the target base station 220 that becomes a target of a handover (Step S110), and performs the handover to the target base station 220. At the same time, in order to perform a handover of the mobile terminal 100 with respect to the target base station 220 that is determined as the target of the handover, the serving base station 210 transmits a handover request message to the gateway 300 (Step S120). The gateway 300 that has received the handover request message performs handover preparation processes of the mobile terminal 100. At this time, the handover preparation processes are processes ranging from Steps S130 to S165 that will be described below.

In order to perform bi-casting for transmitting the same resource to the serving base station 210 and the target base station 220 during the handover, the gateway 300, which has received the handover request message transmitted by the serving base station 210, includes information on a multicast group set for the mobile terminal 100 in advance in the handover request message, and transmits it to the target base station 220 (Step S130). At this time, as shown in the structure of the IGMP message of FIG. 7, the multicast group information is carried in query information in order for the gateway 300 to transmit the multicast group information, and is transmitted to the target base station 220. That is, the multicast group information, which includes the information on the mobile terminal 100 and the serving base station 210 that are currently interconnected with each other through the gateway 300, is transmitted to the target base station 220. Then, if the mobile terminal 100 performs a handover, the target base station 220 can transmit packets to the mobile terminal 100 in which the handover has been performed.

The target base station 220 that has received the handover request message transmits IGMP membership report information to the gateway 300 in the case of the IPv4, and transmits the IGMP report message to the gateway 300 in the case of the IPv6 (Step S140). At this time, the message transmission process is performed in order for the gateway 300 to join the target base station 220, to which a handover of the mobile terminal is performed, to the existing multicast group. In this case, the IGMP report message includes multicast group information that is created by updating corresponding information with information on the mobile terminal 100, information on the serving base station 210, and information on the target base station 220 in the target base station 220.

The target base station 220 that has been joined to the existing multicast group through Step S140 transmits a handover response message serving as a response message of the handover request message to the gateway 300 (Step S150). If the above-described processes are completed, the serving base station 210 and the target base station 220 that have been joined to the multicast group can receive the same traffic from the gateway 300 through the eGTP (Steps S160 and S165). That is, the gateway 300 performs bi-casting on the same traffic and transmits it to the serving base station 210 and the target base station 220. The serving base station 210 and the target base station 220 receive the traffic, respectively.

The serving base station 210 transmits the received traffic to the mobile terminal 100. However, since the target base station 220 is still in a state where a handover of the mobile terminal 100 is not performed, the target base station 220 buffers the received traffic. Here, the reason why the gateway 300 transmits the traffic to the serving base station 210 and the target base station 220 in a bi-casting method is to prevent packets from being lost while the mobile terminal 100 performs the handover, thereby minimizing data loss.

As described above, if the handover preparation processes (Steps S130 to S165) are completed, the gateway 300 transmits a handover command message to the serving base station 210 in a wire interval (Step S180) so as to inform that the preparation processes are completed. The serving base station 210, which has been informed of the preparation processes being completed, transmits the handover command message to the mobile terminal 100 such that the handover is substantially performed (Step S190).

The serving base station 210, which has received the handover command message, transmits context information of the mobile terminal 100, which performs a handover, to the target base station 220 (Step S200). At this time, the serving base station 210 transmits a base station context data message, which includes a sequence number of an eGTP packet having been finally transmitted in a wireless interval, to the target base station 220. In this case, the context data information includes information needed when transmitting data traffic through the serving base station 210 (e.g., sequence number of an SDU transmitted by the serving base station 210 or the like) and information of the mobile terminal 100/RAN context (e.g., information such as an identifier, a Quality of Service (QoS) profile, a SAE bearer, and the like that are associated with the mobile terminal 100).

The target base station 220 that has received the base station context data message transmits a base station context confirmation message to the serving base station 210 in response to the receiving of the corresponding message (Step S210).

If the context information transmitting process of the mobile terminal 100 is completed, the mobile terminal 100 and the target base station 220 perform a process of synchronizing a wireless interval and a process of setting the wireless interval through an L1/L2 (signaling setup process (Step S220). In this case, the L1/L2 signaling setup process is a process that is associated with the L1/L2 like a synchronization of a PHY layer and random access/scheduling of a MAC layer, and is already well-known. In the exemplary embodiment of the present invention, a detailed description thereof will be omitted.

If the process of synchronizing the wireless interval and the process of setting the wireless interval are completed through Step S220, the mobile terminal 100 transmits a handover completion message to the target base station 220 (Step S230), and the target base station 220 transmits the received handover completion message to the gateway 300 (Step S240). If the gateway 300 receives the handover completion message, the gateway 300 recognizes that the handover of the mobile terminal 100 has been completed with respect to a new base station, that is, a target base station 220.

Then, if the handover of the mobile terminal 100 is completed with respect to the target base station 220, the target base station 220 sequentially transmits the traffic buffered by bi-casting to the mobile terminal 100. At this time, the target base station 220 transmits the traffic to the mobile terminal 100 by using a sequence number of the eGTP packet that has been received from the serving base station 210 in Step S200. Further, if the buffered traffic is completely transmitted, the target base station 220 transmits the traffic received from the gateway 300 to the mobile terminal 100 (Step S250).

After Step S220 is completed, the serving base station 210 transmits an IGMP Leave Group (IPv4) or a Done message to the gateway 300. As a result, the serving base station 210 leaves the multicast group (Step S260) that is set in advance (Step S260). In FIG. 8, it may be recognized that Step S260 is performed after Step S250. However, actually, Step S220 is performed, and at the same time, Step S260, where the serving base station 210 leaves the multicast group, is performed in parallel to Step 220. Then, the serving base station 210 performs an L1/L2 signaling process in order to release a resource of the set wireless interval (Step S270). Since the L1/L2 signaling process is already well-known, a detailed description thereof will be omitted in the exemplary embodiment of the present invention.

Next, referring to FIGS. 9A to 9C, a description is given to a gateway operation process in which the gateway transmits data traffic at the time of the handover process having been described with reference to FIG. 8.

Figure 9A:
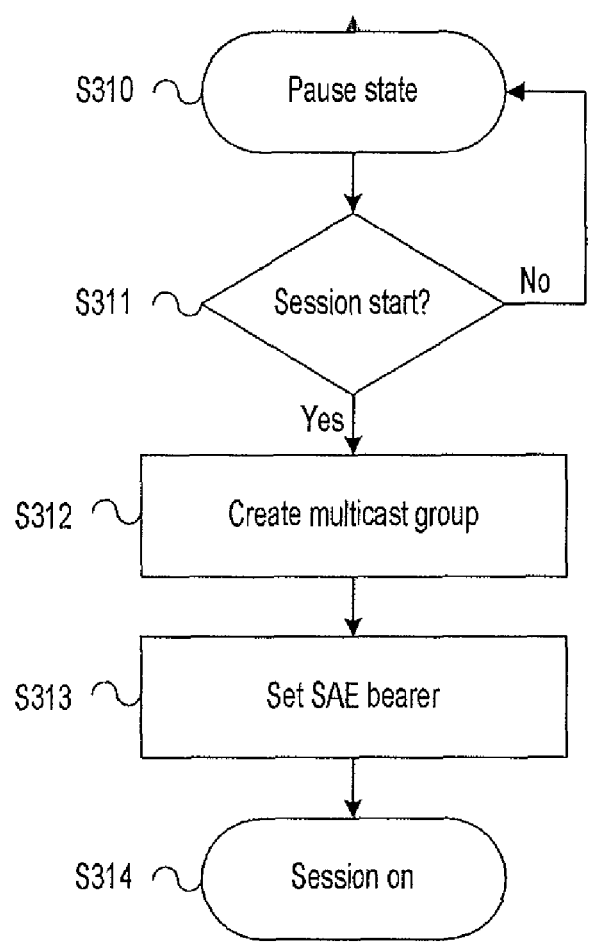
FIGS. 9A to 9C are flowcharts illustrating an operation process of a gateway for transmitting data in a handover between base stations according to an exemplary embodiment of the present invention.
Figure 9B:
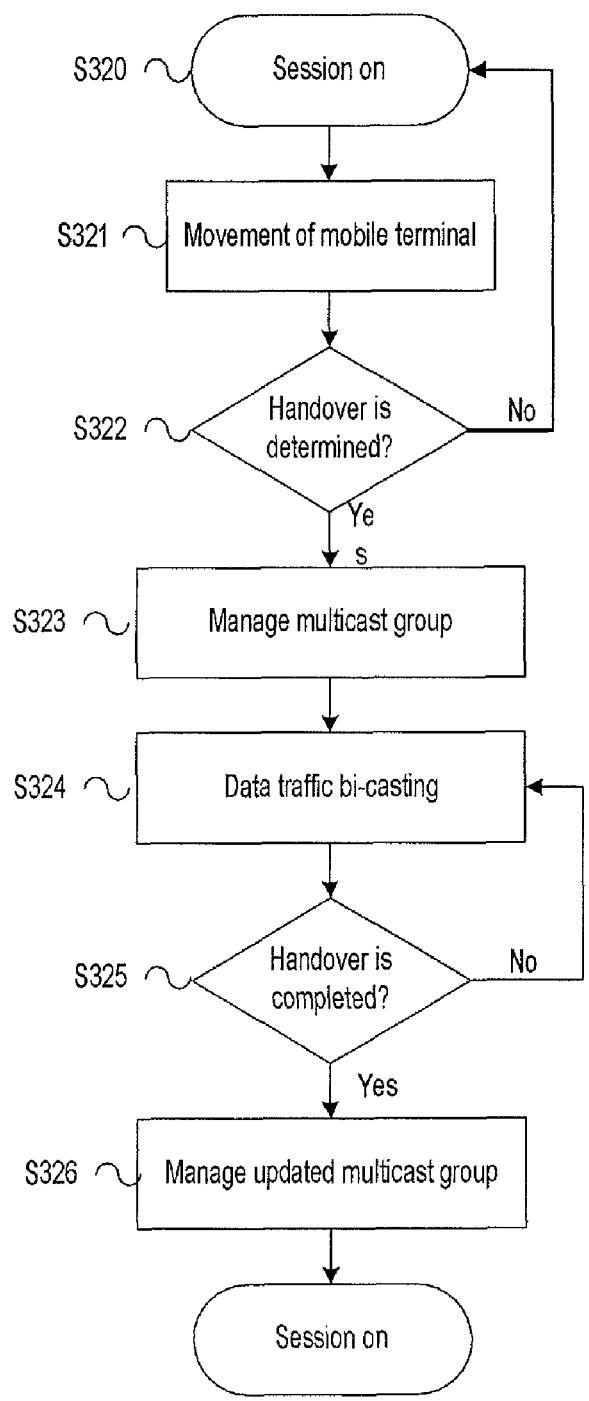
Figure 9C:
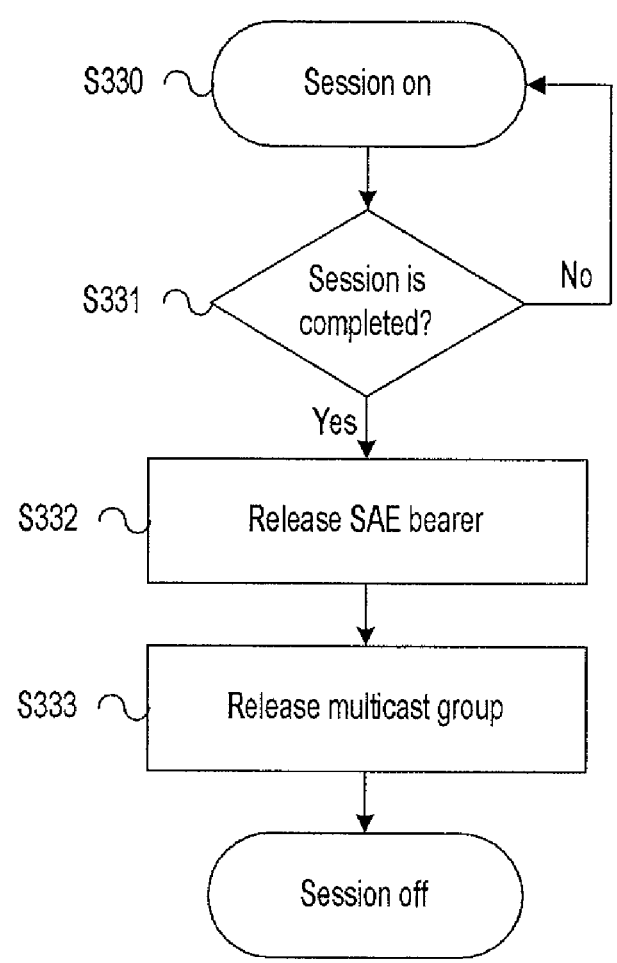

FIGS. 9A to 9C are flowcharts illustrating an operation process of a gateway to transmit data traffic in a handover between base stations according to an exemplary embodiment of the present invention. In this case, in order for the operation process of the gateway to be specifically described, the operation process of the gateway is divided into an initial session start process (refer to FIG. 9A), a handover process (refer to FIG. 9B), and a session release process (refer to FIG. 9C).

First, as shown in FIG. 9A, the gateway determines whether, in a pause state (Step S310), the session starts or not (Step S311). When it is determined that the session does not start, the gateway continuously maintains the pause state (Step S310). In this case, the pause state is a state where there is no session for a mobile terminal. However, when the session starts, the gateway creates a multicast group for the purpose of the S1 connection of the corresponding session (Step 312) and manages it. Then, the gateway sets an SAE bearer (Step S313) so as to cause the session to enter an On state (Step S314).

As such, referring to FIG. 9B, a description is given to a process of when a handover is generated due to the movement of the mobile terminal in a situation where the session enters an On state.

As shown in FIG. 9B, if the gateway detects movement of the mobile terminal (Step S321), the gateway determines whether a handover of the mobile terminal is generated or not (Step S322). If the mobile terminal moves in a state where the handover of the mobile terminal is not generated, the session continuously maintains an On state (Step S320).

However, when the handover of the mobile terminal is generated, the gateway manages a multicast group table that is updated through a process of joining the target base station into a multicast group (Step S323), and transmits data traffic to the serving base station and the target base station in a bi-casting method (Step S324). Then, the gateway determines whether the handover of the mobile terminal is completed (Step S325). When it is determined that the handover of the mobile terminal is completed, the gateway updates and manages a multicast group table that is generated when the serving base station leaves the multicast group (Step S326). That is, in Step S323, the multicast group table that is managed by the gateway includes information on the mobile terminal, information on the serving base station, and information on the target base station. However, the multicast group table that is managed in Step S326 includes information on the mobile terminal and information on the target base station.

As shown in FIG. 9C, the gateway determines whether transmission of the data traffic is completed between the mobile terminal and the serving/target base station and the session is completed (Step S331). When the session in the On state (Step 330) is completed, the gateway releases the set SAE bearer for the purpose of the S1 connection of the corresponding session (Step S332). Then, the gateway deletes the multicast group that is managed by the gateway (Step S333).

Figure 10:
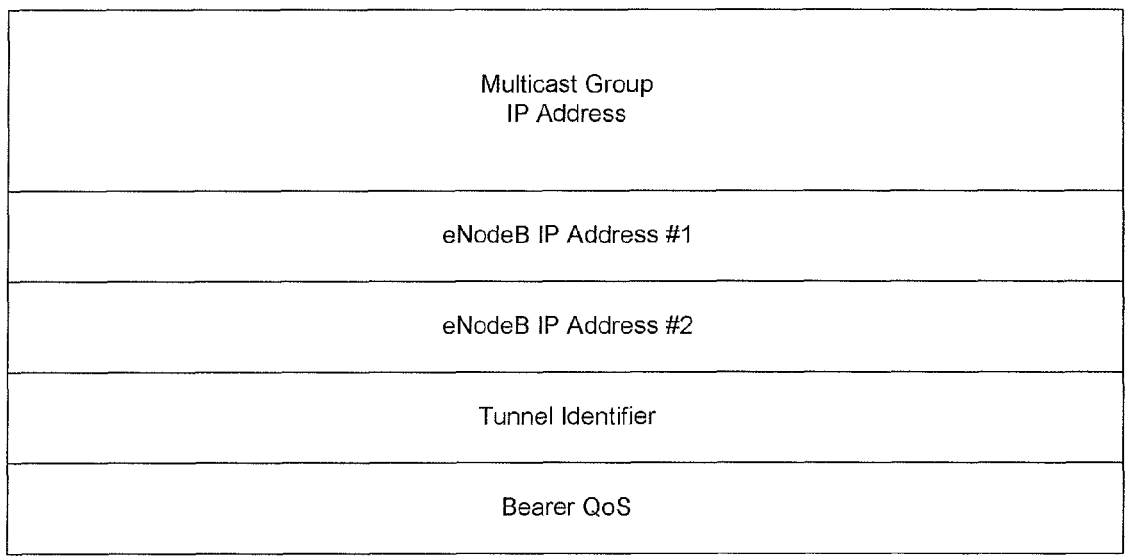
FIG. 10 is an exemplary view illustrating SAE (System Architecture Evolution) bearer context information according to an exemplary embodiment of the present invention.

In this case, SAE bearer context information for the SAE bearer that is set and released by the gateway when describing the processes of FIGS. 9A to 9C is as shown in FIG. 10.

FIG. 10 is an exemplary view illustrating SAE bearer context information according to an exemplary embodiment of the present invention.

As shown in FIG. 10, since an S1 data connection function is performed using multicast in the exemplary embodiment of the present invention, the SAE bearer context includes information that is associated with a multicast IP address, IP addresses of a serving base station and a target base station, a tunnel identifier that is used in an eGTP, a QoS profile describing a service characteristic of S1, or the like.

In this case, a program that implements a function corresponding to the above-described structure according to the exemplary embodiment of the present invention and a recording medium having the program recorded therein are included in the scope of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the above-described exemplary embodiment of the present invention, when the mobile terminal performs a handover between base stations, the gateway bi-casts the data traffic to the target base station to which a handover of the mobile terminal is made, thereby efficiently using a resource of a user plane connection interval between the gateway and the base stations.

Further, the data traffic is transmitted by using bi-casting in a handover between the base stations, which minimizes the loss of data transmitted in a downlink.

Furthermore, when the base station transmits data traffic to the mobile terminal through a wireless interval, a process of re-ordering data is omitted. Accordingly, a load of the base station can be reduced, and the structure of the base station can be simply implemented.

What is claimed is:
1. A method of transmitting data in a handover between a serving base station and a target base station in a wireless communication system, the method comprising:
    causing the serving base station to determine a handover of a mobile terminal and transmit a handover request message including information on the target base station to a gateway;
    receiving a first handover request message including information on a target base station from the serving base station;
    transmitting a second handover request message including multicast group information to the target base station based on the first handover request message;
    joining the target base station into an existing multicast group subsequent to receiving a message that includes the multicast group information that is updated by including the information on the target base station;
    causing the serving base station to receive a handover command message informing that handover preparation processes of the mobile terminal have been performed from the gateway and transmit a base station context data message to the target base station;

receiving a handover response message from the target base station that has been joined into the multicast group transmitting data traffic to the serving base station and the target base station; and receiving a handover completion message from the target base station, the handover completion message informing that a handover of a mobile terminal is completed from the serving base station to the target base station included in the updated multicast group information; and transmitting the data traffic to the mobile terminal through the target base station.

2. The method of claim 1, wherein the transmitting of the data traffic comprises transmitting the same data traffic to the serving base station and the target base station in a bi-casting method.

3. The method of claim 2, further comprising:
buffering the data traffic in the target base station until receiving the handover completion message from the target base station.

4. The method of claim 1, further comprising, before the transmitting of the second handover request message:
determining whether a session for transmitting the data traffic to the mobile terminal is connected;
creating the multicast group including information on the mobile terminal and information on the serving base station when the session is connected; and
setting an System Architecture Evolution (SAE) bearer for transmitting the data traffic transmitted to the serving base station to the mobile terminal.

5. The method of claim 1, further comprising transmitting a handover command message to the serving base station so as to inform that a handover preparation process is completed.

6. The method of claim 1, further comprising:
receiving a multicast group leaving message from the serving base station when a handover of the mobile terminal to the target base station is completed, the multicast group leaving message informing that the serving base station leaves the multicast group; and
updating the multicast group information.

7. The method of claim 6, wherein the multicast group information includes the information on the mobile terminal, the information on the serving base station, and connection information between the mobile terminal and the serving base station.

8. The method of claim 1, wherein the transmitting of the data traffic to the serving base station and the target base station comprises transmitting the data traffic to the serving base station and the target base station by using an evolved GPRS (General Packet Radio Service) Tunneling Protocol (eGTP) that is a user plane protocol.

9. The method of claim 8, further comprising setting an System Architecture Evolution (SAE) bearer for transmitting the data traffic transmitted to the serving base station to the mobile terminal,
wherein the SAE bearer includes information on an IP address of the multicast group, an IP address of the serving base station, an IP address of the target base station, a tunnel identifier used in the eGTP, and a QoS profile.

10. A method of performing a handover in a target base station of a wireless communication system, the method comprising:
causing a serving base station to determine a handover of a mobile terminal and transmit a handover request message including information on the target base station to a gateway;

receiving the handover request message including multicast group information from the gateway;
transmitting a message informing that the target base station joins the multicast group including the mobile terminal and the serving base station to the gateway in order to enable the gateway to join the target base station into the multicast group, the message including the multicast group information that is updated by including information on the target base station;
transmitting a handover response message after the target base station have been joined into the multicast group;
receiving data traffic from the gateway;
buffering the received data traffic until a handover of the mobile terminal is completed;
causing the serving base station to receive a handover command message informing that handover preparation processes of the mobile terminal have been performed from the gateway and transmit a base station context data message to the target base station;
receiving a base station context data message from the serving base station;
performing a synchronization with the mobile terminal and setting a wireless interval; and
transmitting the buffered data traffic to the mobile terminal based on the base station context data message when receiving a handover completion message from the mobile terminal.

11. The method of claim 10, wherein the multicast group information includes information on the mobile terminal and information on the serving base station,
the method further comprising setting the multicast group for data transmission between the mobile terminal and the serving base station.

12. The method of claim 10, wherein the base station context data message includes a sequence number of traffic that the serving base station finally transmits to the mobile terminal.

13. The method of claim 10, wherein the serving base station performs a process of leaving the multicast group while the synchronization is performed between the mobile terminal and the target base station.

14. The method of claim 13, wherein, when the serving base station leaves the multicast group, the serving base station performs a process of releasing a resource in a wireless interval set between the serving base station and the mobile terminal.

15. The method of claim 10, wherein the data traffic that is received from the gateway is the same as data traffic that is transmitted to the serving base station in a bi-casting method.

16. A method of performing a handover in a target base station of a wireless communication system, the method comprising:
causing a serving base station to determine a handover of a mobile terminal and transmit a handover request message including information on the target base station to a gateway;
receiving a handover request message including multicast group information from a gateway;
transmitting a message informing that the target base station joins into the multicast group including a mobile terminal and a serving base station to the gateway in order to enable the gateway to join the target base station into the multicast group, the message including the multicast group information that is updated by including information on the target base station;
transmitting a handover response message after the target base station has been joined into the multicast group;

receiving data traffic from the gateway;

buffering the received data traffic until a handover of the mobile terminal is completed;

receiving a base station context data message from the serving base station;

performing a synchronization with the mobile terminal and setting a wireless interval;

transmitting the buffered data traffic to the mobile terminal based on the base station context data message when receiving a handover completion message from the mobile terminal;

causing the serving base station to receive a handover command message informing that handover preparation processes of the mobile terminal have been performed from the gateway and transmit a base station context data message to the target base station; and interconnecting to the mobile terminal base station by periodically sending a pilot channel to the mobile terminal to enable the mobile terminal to perform a measurement process based on the pilot channel to determine whether another handover is needed.

* * * * *